(12) United States Patent
Siep et al.

(10) Patent No.: US 6,452,480 B1
(45) Date of Patent: *Sep. 17, 2002

(54) ACTIVE WIRELESS NETWORK FOR CALCULATORS

(75) Inventors: Thomas M. Siep, Garland, TX (US); Ronald E. Stafford, Wylie, TX (US)

(73) Assignee: Texas Instruments Incorporated, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1005 days.

(21) Appl. No.: 08/706,123

(22) Filed: Aug. 30, 1996

(51) Int. Cl.⁷ .................................................. H04J 3/24
(52) U.S. Cl. .......................... 340/3.5; 709/208; 709/245
(58) Field of Search ........................ 340/825.07, 825.08, 340/825.16, 825.52, 825.54; 364/705.05, 705.01, 700; 370/346; 434/118, 351

(56) References Cited

U.S. PATENT DOCUMENTS

| | | | | |
|---|---|---|---|---|
| 3,676,939 A | | 7/1972 | Oberst et al. ................... | 35/48 |
| 4,367,485 A | | 1/1983 | Hemmie ........................ | 358/86 |
| 4,466,001 A | * | 8/1984 | Moore et al. ................ | 370/346 |
| 4,700,374 A | | 10/1987 | Bini ............................ | 379/60 |
| 4,763,329 A | | 8/1988 | Green .......................... | 371/11 |
| 4,809,268 A | * | 2/1989 | Tejima et al. ................ | 370/346 |
| 5,002,491 A | | 3/1991 | Abrahamson et al. ....... | 434/322 |
| 5,038,140 A | | 8/1991 | Ikeuchi ........................ | 340/825 |
| 5,142,550 A | | 8/1992 | Tymes .......................... | 375/1 |
| 5,263,869 A | | 11/1993 | Ziv-El ......................... | 434/336 |
| 5,273,437 A | | 12/1993 | Caldwell et al. ............. | 434/351 |
| 5,297,144 A | * | 3/1994 | Gilbert et al. .............. | 370/346 |
| 5,303,042 A | | 4/1994 | Lewis et al. .................. | 348/14 |
| 5,493,569 A | | 2/1996 | Buchholz et al. .......... | 370/85.7 |
| 5,537,141 A | | 7/1996 | Harper et al. ................. | 348/12 |
| 5,537,626 A | | 7/1996 | Kraslavsky et al. ......... | 395/828 |
| 5,561,446 A | | 10/1996 | Montlick ..................... | 345/173 |
| 5,640,673 A | | 6/1997 | Tanabe ....................... | 455/12.1 |

OTHER PUBLICATIONS

Ng, Jim M., Edward Chan, Peter H.H. Tsang, *Interactive Group Discussion System for Distance Education*, IEEE Multimedia Engineering Education, pp 270–275.

* cited by examiner

Primary Examiner—Michael Horabik
(74) Attorney, Agent, or Firm—Ronald O. Neerings; Wade James Brady, III; Frederick J. Telecky, Jr.

(57) ABSTRACT

The present invention provides a wireless network including a master processing device (14) for generating information and broadcasting the information through wireless, transmission of signals and a plurality of client processing devices (18) having circuitry for receiving the information from the master processing device (14) and transmitting other information to the master processing device (14). The master processing device (14) selects one of the plurality of client processing devices (18) to acknowledge the receipt of the information from the master processing device.

19 Claims, 6 Drawing Sheets

Fig. 5a  Fig. 5b

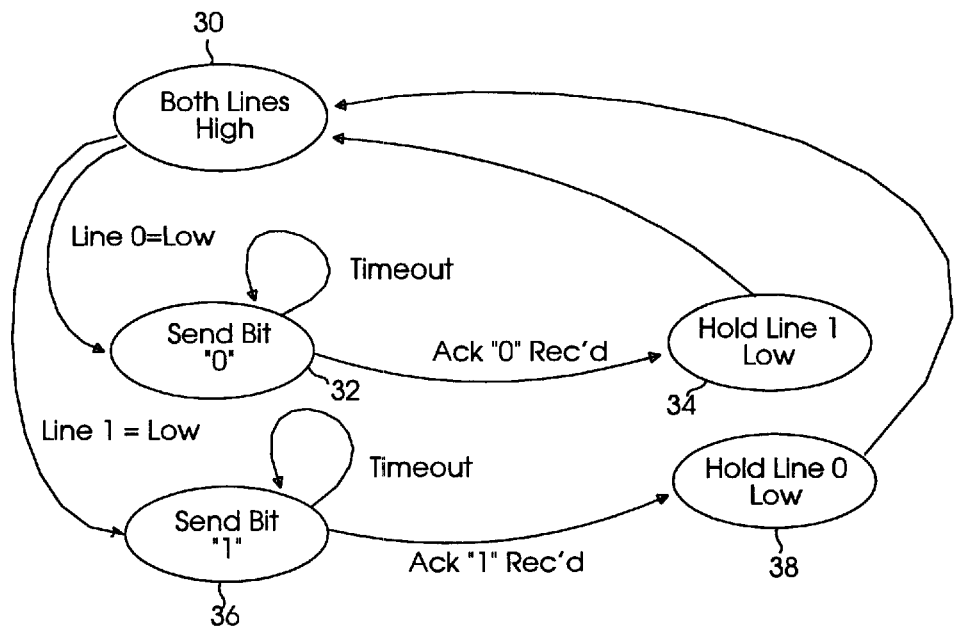
Fig. 4a
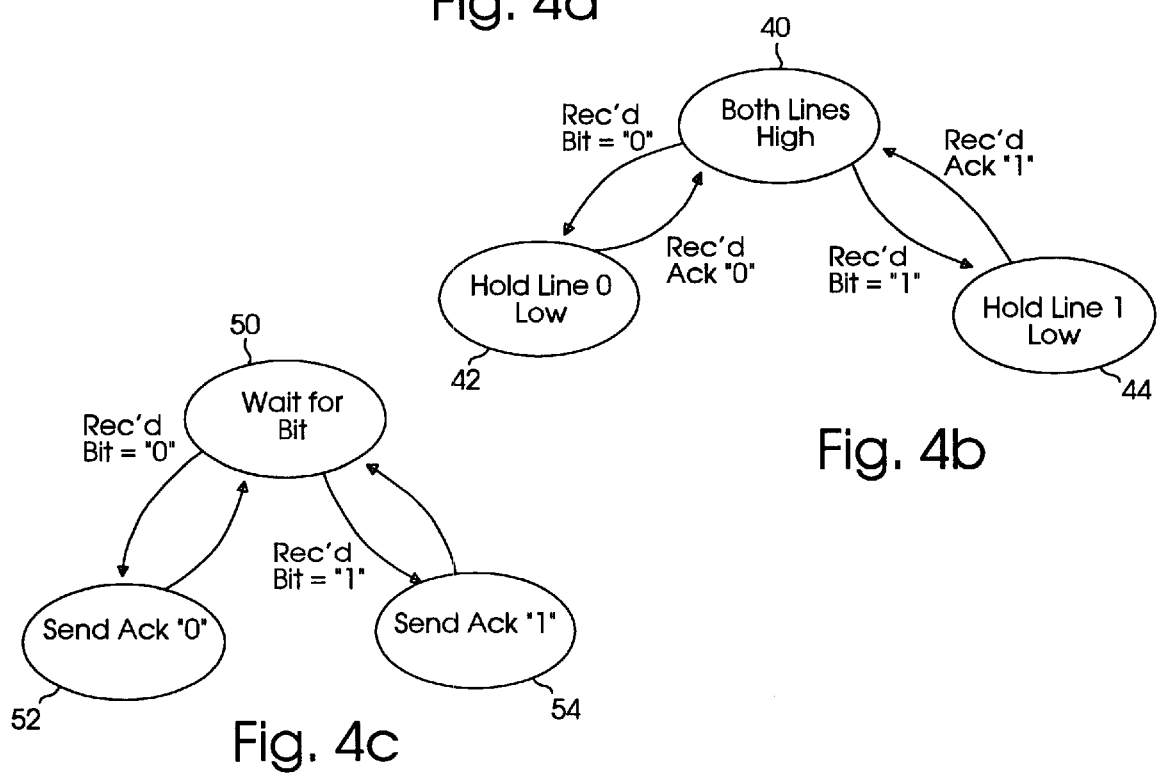
Fig. 4b
Fig. 4c

ACTIVE WIRELESS NETWORK FOR CALCULATORS

BACKGROUND OF THE INVENTION

1. Technical Field

This invention relates in general to calculators and, more particularly, to providing a wireless network to communicate data between calculators.

2. Description of the Related Art

Electronic calculators have evolved significantly since their inception as a general consumer product in the early 1970's. In addition to arithmetic calculations, current day calculators often provide programming and graphing functions. Graphing calculators include a screen able to display graphics in addition to alphanumeric characters.

For some time, graphing calculators have been able to communicate to one another through a wired connection. An example of a calculator of this type is the TI-92 calculator produced by Texas Instruments Incorporated of Dallas, Tex. Wired connections may be used, for example, in a classroom setting where problem sets are downloaded from the teacher's calculator to the students' calculators. Once downloaded, the students can use the calculator to solve the problem.

Despite the advantages of such as system, communication between calculators has not been accepted in widespread use. One reason is that the wires between calculators are somewhat cumbersome to distribute to the students. While the wires could be built into a classroom's infrastructure, the cost of providing the wiring to each desk would be significant. Further, permanent wiring would inhibit flexible arrangement of the student's desks.

Accordingly, there is a need for method and apparatus of connecting calculators in a flexible manner.

SUMMARY OF THE INVENTION

The present invention provides a wireless network including a master processing device for generating information and broadcasting the information through wireless transmission of signals and a plurality of client processing devices having circuitry for receiving the information from the master processing device and for transmitting other information to the master processing device. The master processing device selects one of the plurality of client processing devices to acknowledge the receipt of the information from the master processing device.

The present invention provides significant advantages over the prior art. First, data transfer from the master processing device to the client processing devices is accurate, since the transfer is acknowledged by the selected processing device. Further accuracy can be achieved by polling each client processing device. Second, the wireless transmission of signals can achieved using modules added to existing calculator designs.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a, 4b and 4c are state diagrams describing operation of the master module, client module and transponder using a D-bus protocol calculator;

FIGS. 5a, 5b and 5c are block diagrams for the master module, client module and transponder using a D-bus protocol calculator;

FIG. 8 illustrates a state diagram for the master module of FIG. 7a;

DETAILED DESCRIPTION OF THE PREFERRED EMBODIMENT

The present invention is best understood in relation to FIGS. 1–10 of the drawings, like numerals being used for like elements of the various drawings.

Figure 1:
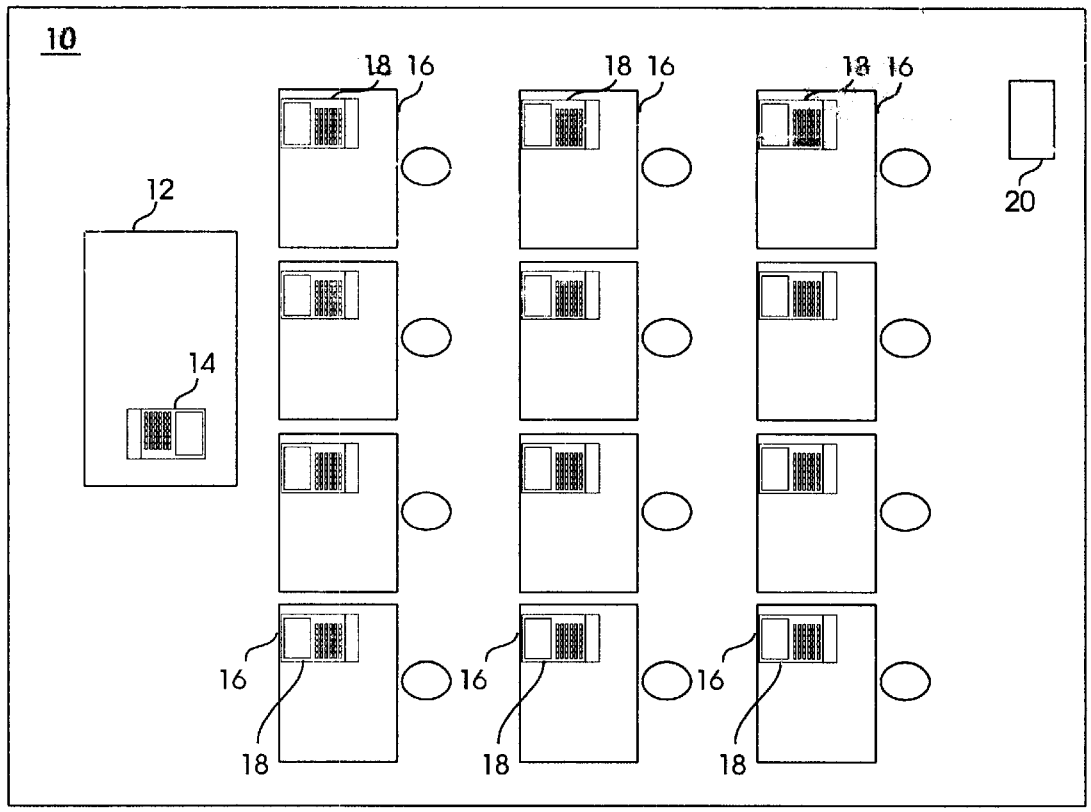
FIG. 1 is a diagram of a classroom using a wireless calculator network.

FIG. 1 illustrates a representation of a classroom setting. The classroom setting 10 comprises a teacher's desk 12 with a teacher's (master) calculator 14 and a plurality of student desks 16 with student, (client) calculators 18. As described in greater detail hereinbelow, the teacher's calculator 14 has the ability to both send and receive data using radio waves. In this embodiment, the client calculators 18 can receive data over the radio waves, but do not need send capability in the scenario of FIG. 1. A transponder 20 is placed in the classroom 10 at a point where it receives the output of the master calculator 14 to a degree which is no better than that of the client calculator 18 having the poorest reception.

In operation, the master calculator 14 broadcasts data to all client calculators 18 and to the transponder 20. Upon receipt of data, the transponder 20 sends an acknowledgment to the master calculator confirming that the data was received. When an acknowledgment is received by the master calculator 14, it assumes that all the client calculators 18 have also received the data. On the other hand, if the master calculator does not receive an acknowledgment within a predetermined time (the "timeout" period) of sending data, then it assumes that the data was not received by all the client calculators 18 and re-sends the data. A more detailed description of a protocol for sending, receiving and acknowledging data is shown in FIGS. 4a–c.

Figures 2A, 2B, 2C:
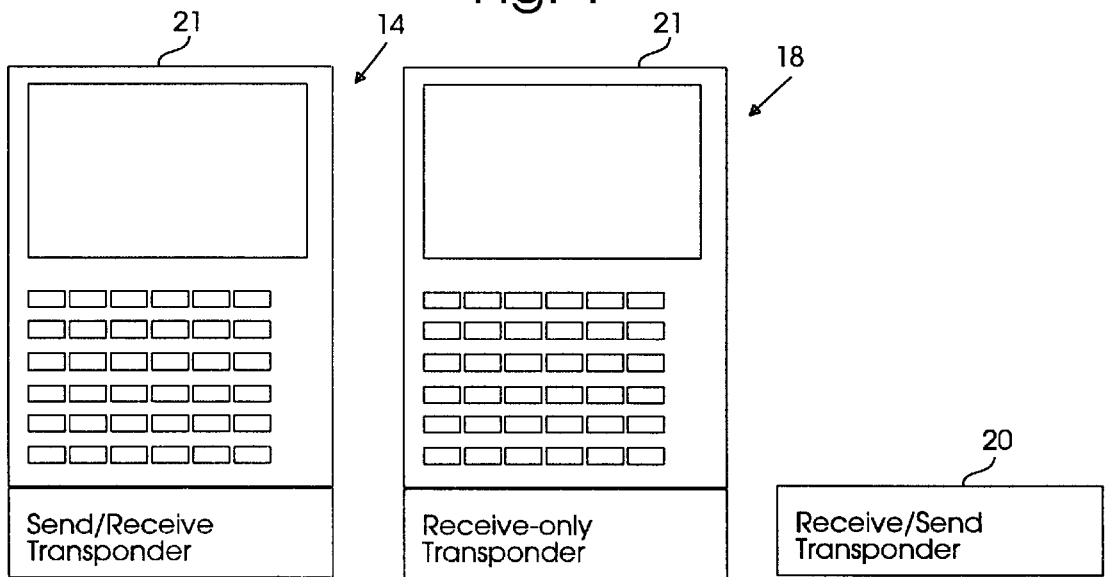
FIGS. 2a, 2b and 2c are diagrams of the teacher (master) calculator, student (client) calculator and transponder.

A significant advantage of the embodiment shown in FIG. 1 is that a wireless network can be provided for a classroom, or other setting, using existing calculators which support wired connection. The wireless network is achieved by adding a module to the communications port of each calculator as shown in FIGS. 2a–b. The master calculator 14 includes a calculator module 21, which may be a pre-existing calculator with a port for a wired connection to other calculators, and a send/receive transponder module 22. Each student calculator 18 also includes a calculator module 21 and a receive-only transponder module 24. The receive/send transponder 20 does not need a corresponding calculator module 21.

The modules 22 and 24 are transparent to the calculator, i.e., the calculator modules 21 operate as if they were connected by a cable. The master module 22 translates data signals from the master calculator's communication port to radio waves (or, alternatively, to infra-red or other suitable frequency) which are broadcast and, ideally, received by the client modules 24. Each client module 24 translates the received data signal and sends electrical signals to the port of the attached client calculator 18. The transponder 20 does not need to translate the signal; upon receiving a data signal from the master module 22, it sends an appropriate acknowledgment signal.

Figure 3:
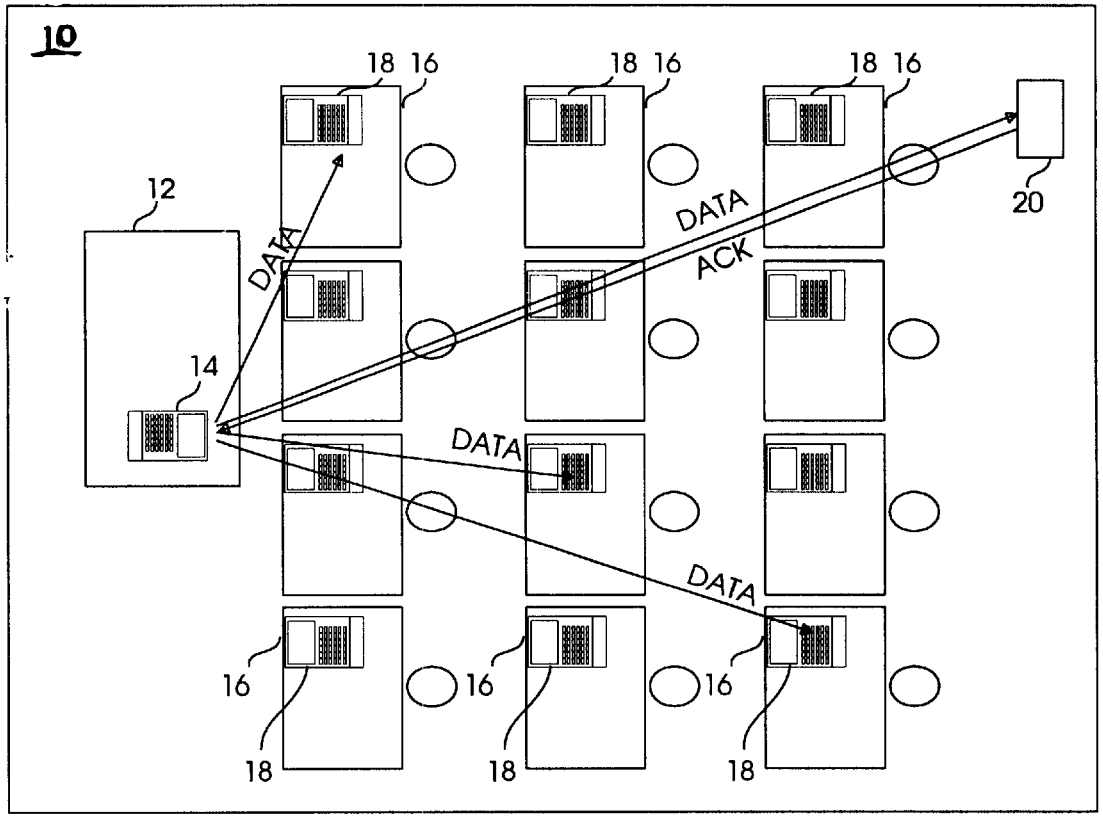
FIG. 3 is a diagram showing communication paths in a first embodiment of a wireless network.

FIG. 3 illustrates a depiction of the classroom 10 of FIG. 1 with representative signals between the master calculator 14 and the client calculators 18 and transponder 20. As shown in FIG. 3, by placing the transponder 20 in a position, such as a corner located at a back wall of the classroom, it can be relatively certain that proper reception of data by the transponder 20 will be indicative of proper reception of the data signal by all of the client modules 24 in the classroom. If such is not the case, the transponder 20 can be moved to another location in the classroom 10.

The embodiment described in connection with FIGS. 2–3 has significant advantages. First, add-on modules can be used to update existing calculators, so that classrooms which have already purchased calculators do not lose their investment. Second, since only the transponder 20 needs to communicate an acknowledgment signal, rather each client calculator providing an independent acknowledgment of data, the client modules 24 do not need any transmit circuitry. Accordingly, only the master module 22 and the transponder 20 have transmit circuitry, thereby reducing the overall cost of the calculator network.

It is anticipated that the master module will broadcast at a power which is low enough that it will not transmit through walls and affect modules in adjacent classrooms. Alternatively, the modules in each classroom could be set to different frequencies to prevent communications between classrooms.

FIGS. 4a–c illustrate a particular implementation for the modules 22 and 24, and the receive/send transponder 20, respectively. The implementation shown in FIGS. 4a–c is specific to a protocol used by the D-bus architecture of the Texas Instruments series of graphing calculators, it being understood that the devices could be modified for other protocols as well.

Prior to describing operation of the modules 22 and 24 and the receive/send transponder 20, the operation of the data transfer mechanism of the D-bus will be briefly outlined herein. Two lines (Line0 and Line1) of the D-bus are used to output data as a serial stream of logical "1's " and "0's". Normally, both Line0 and Line1 are held high. To transfer a logical "0", Line0 is pulled low at the port of the sending calculator, which creates a voltage differential between Line0 and Line1. The receiving calculator acknowledges receipt by pulling Line1 low. After acknowledgment, Line0 is driven high by the sending calculator and Line1 is driven high by the receiving calculator to return the lines to their default high state.

Similarly, to transfer a logical "1, Line1 is pulled low at the port of the sending calculator, which creates a voltage differential between Line0 and Line1 (which is the opposite in polarity to the differential created by sending a logical "0"). The receiving calculator acknowledges receipt by pulling Line0 low. After acknowledgment, Line0 is driven high by the sending calculator and Line1 is driven high by the receiving calculator to return the lines to their default high state.

As described above, the wireless modules 22 and 24 may be designed to couple to the communications ports on the master and client calculators 21. Hence, modules 22 and 24 mimic the protocol described above so that operation of the wireless network is transparent to the calculators 21.

FIG. 4a is a state diagram which illustrates the operation of the master module 22 for the D-bus protocol. In state 30, both Line0 and Line1 of the teacher's calculator 21 are high (i.e., no data is being transmitted). From this state, the teacher's calculator may drive either Line0 or Line1 low to send a logical "0" or "1", respectively, to the student calculators 18. If Line0 is driven low by the teacher's calculator 21, the state of the module 22 changes to state 32, where the module transmits a signal through the air (using radio frequency or infra-red frequency, for example) corresponding to a logical bit "0". This signal should be received by the client modules 24 and the transponder 20. When the transponder 20 receives a signal corresponding to a logical "0", it sends an acknowledgment of the receipt. In the illustrated embodiment, the transponder's acknowledgment to a received bit "0" is referred to as Ack "0" and an acknowledgment of a received bit "1" is a Ack "1".

From state 32, the module 22 waits for Ack "0". If the Ack "0" signal is received prior to a predetermined time (i.e., within the timeout period), the state will change to state 32, where the module 22 will hold Line1 of the communications port of the teacher's calculator 21 low, to complete the protocol described above. After both lines have been held low, the state returns to state 30, where both lines are held high, awaiting transmission of the next bit.

On the other hand, if the proper acknowledgment is not received in state 32 within the timeout period, then the master module 22 will resend the transmission of a logical "0".

If in state 30, Line1 is driven low by the teacher's calculator 21, the state of the module 22 changes to state 36, where the module transmits a signal through the air corresponding to a logical bit "1". This signal should be received by the client modules 24 and the transponder 20. When the transponder 20 receives a signal corresponding to a logical "1", it sends an acknowledgment of the receipt (Ack "1").

From state 36, the module 22 waits for Ack "1". If the Ack "1" signal is received within the timeout period, the state will change to state 38, where the module 22 will hold Line0 of the communications port of the teacher's calculator 21 low, to complete the protocol described above. After both lines have been held low, the state returns to state 30, where both lines are held high, awaiting transmission of the next bit.

On the other hand, if the proper acknowledgment is not received in state. 36 within. the timeout period, then the master module 22 will resend the transmission of a logical "1".

FIG. 4b illustrates a state diagram for the client modules 24. In state 40, both Line1 and Line2 of the student calculators are held high as the student calculators await receipt of a data transmission. From state 40, if a bit "0" is received by the client module 24, the state changes to state 42, and the module pulls Line0 to a low voltage. Under normal circumstances, any data transmission received by the client module 24 in state 40 will have been generated by the master module 22. Line0 will be held low until the client module 24 receives the acknowledgment from the transponder 20, i.e., until the client module 24 receives a Ack "0", in the illustrated embodiment. At this point, the client module will release Line0 and the student calculator 21 will release Line1 to return to state 40.

Returning to state 40, if a bit "1" is received by the client module 24, the state changes to state 44, and the module pulls Line1 to low. Line1 will be held to a low voltage until the client module 24 receives the acknowledgment from the transponder 20, i.e., until the client module 24 receives a Ack "1". At this point, the client module 24 will release Line1 and the client calculator 21 will release Line0 to return to state 40.

FIG. 4c illustrates the state diagram for the transponder 20. In state 50, the transponder is waiting for transmission of either a bit "0" or a bit "1" from the master module 22. If a bit "0" is received in state 50, the state changes to state 52, where the transponder transmits an Ack "0" and returns to state 50. Similarly, if a bit "1" is received in state 50, the state changes to state 54, where the transponder transmits an Ack "1" and returns to state 50.

Figure 5C:
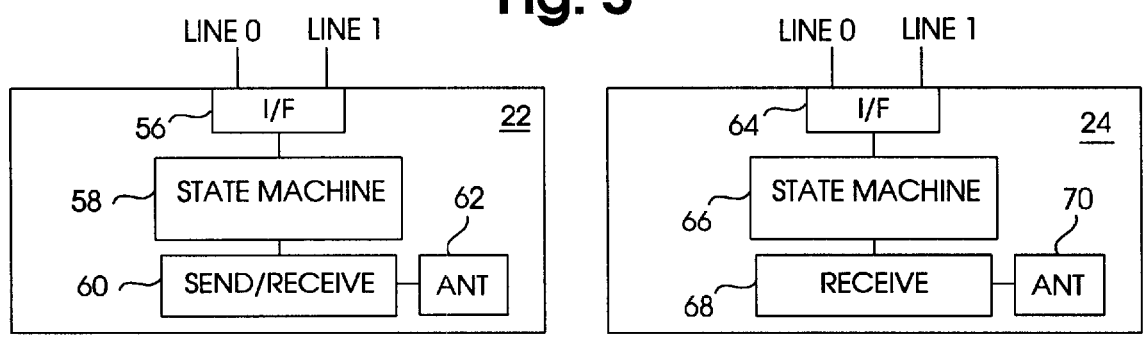
Figure 5C:
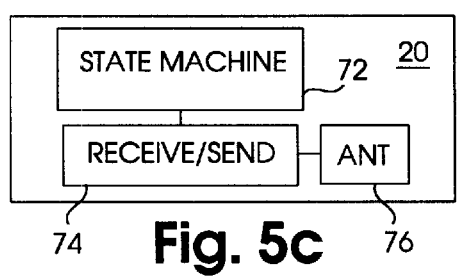

FIGS. 5a–c illustrate block diagrams for the master and client modules 22 and 24 and the transponder 20, respectively. In FIG. 5a, the master module 22 comprises interface circuitry 56 for coupling with the Line0 and Line1 input/outputs from the calculator 21. The interface circuitry 56 is coupled to a state machine 58. State machine 58 is coupled to the send/receive circuitry 60. Send/receive circuitry 60 is also coupled to antenna 62.

In operation, the send/receive circuitry 60 is operable to send and receive signals over the air, typically using well-known technologies such as radio or infra-red signally as is commonly used in remote control systems. The state machine 58 acts on signals from the send/receive circuitry 60 as described in connection with FIG. 4a. The send/receive circuitry 60 may be very simple because it need only detect-two signals (Ack 0 and Ack 1) and send two signals (Bit "0" and Bit "1").

The client module 24, as described above, is similar to the master module 22, but does not need any send capability. Accordingly, the client module 24 comprises interface circuitry 64, for coupling with the Line0 and Line1 input/outputs from the client calculator 21, coupled to a state machine 66. State machine 66 is coupled to the receive circuitry 68. Receive circuitry 68 is also coupled to antenna 70.

In operation, the receive circuitry is operable to detect signals transmitted over the air, namely the Bit "0", Bit "1", Ack "0" and Ack "1" signals. The state machine 66 controls the Line0 and Line1 pins of the client calculator 21 as described in connection with FIG. 4b.

The transponder 20 comprises a state machine 72, a send/receive module 74 and an antenna 76. The send/receive module can detect transmissions from the master module 22 (Bit "0" and Bit "1") and send acknowledgment signals (Ack "0" and Ack "1") under control of the state machine 72. The state machine is programmed to perform the method shown in FIG. 4c.

The state machines 58, 66 and 72 can be implemented using a simple programmable processor such as a PIC16C5X.

While this embodiment of the wireless network uses a separate acknowledgment for each bit transmitted by the master calculator 14, it would also be possible to acknowledge the transmissions of groups of bits.

FIGS. 6–10 illustrate a second embodiment of a wireless network wherein the client calculators include receive/send circuitry.

Figure 6:
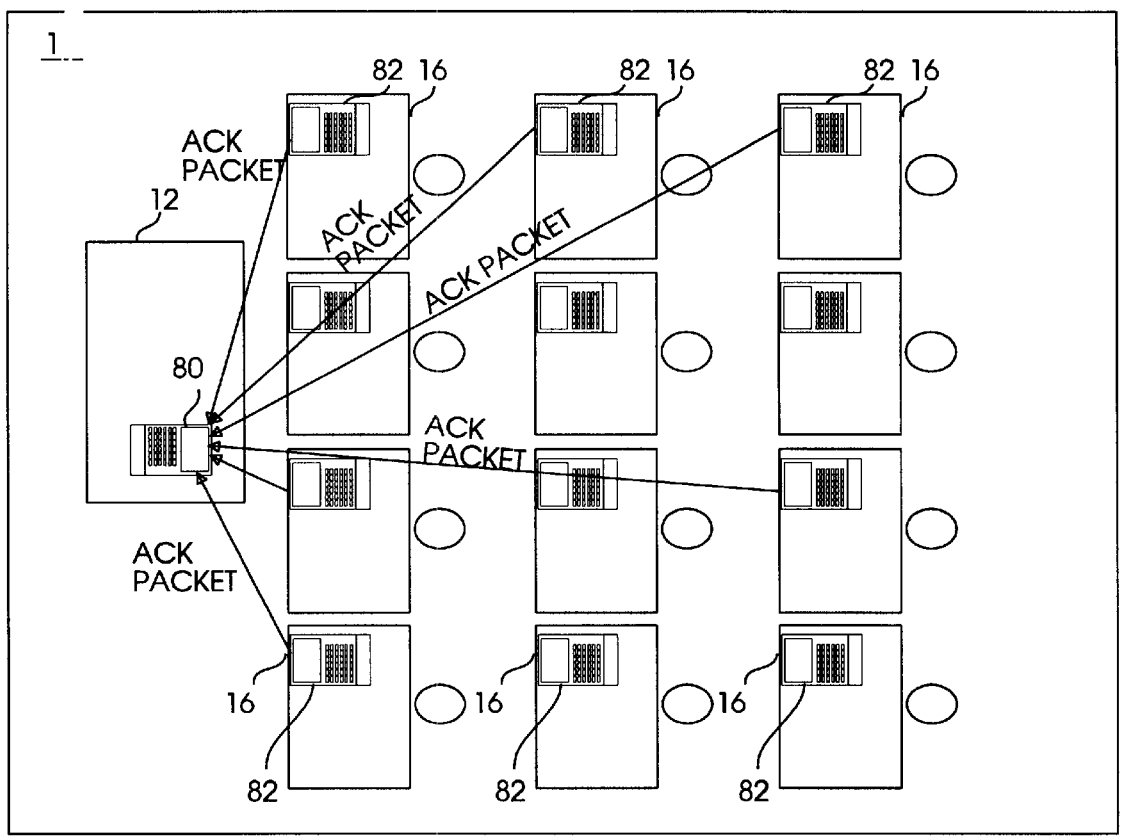
FIG. 6 illustrates communication paths in a second embodiment of a wireless network.

In FIG. 6, a classroom setting 10 showing data paths between the master calculator 80 and client calculators 82 are shown. In this embodiment, it is assumed that each of the client calculators 82 can be individually identified and addressed.

In operation, the master calculator 80 broadcasts data to all calculators in the classroom. Each bit is verified using a protocol similar to the one described in FIGS. 4a–c (described in greater detail in connection with FIGS. 9a–b), i.e., an acknowledge signal is returned for each transmitted bit (or, alternatively, for each group of bits), with a selected client calculator 82 performing the verification function for each bit. The selected client calculator 82 should be chosen such that all other client calculators 82 receive a signal of at least equivalent signal strength as the selected client calculator.

Bits are grouped into packets which contain bits for error detection or error detection and correction schemes. After each packet is sent, the master calculator 80 polls each of the client calculators 82 to ensure that each packet was correctly received. If not, the data is re-sent.

Figures 7A, 7B:
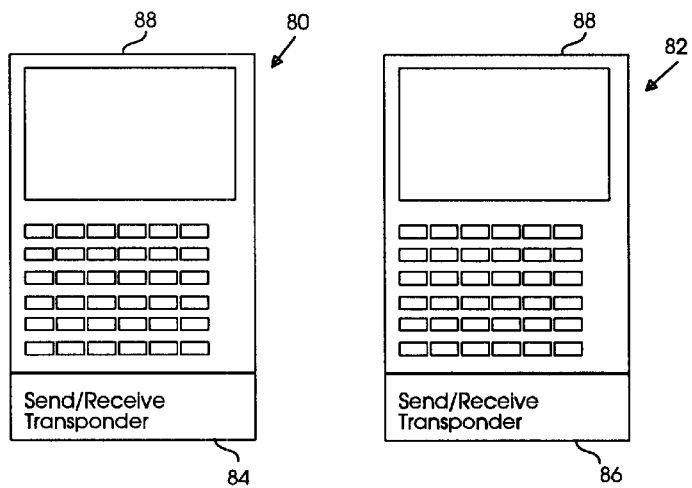
FIGS. 7a and 7b illustrate calculators used in the second embodiment of a wireless network.

The wireless network depicted in FIG. 6 can be achieved using existing graphing calculators with wired network capability, or with calculators with integrated wireless network capability. For illustration, as shown in FIGS. 7a–b, it will be assumed that modules 84 and 86 are added to existing graphing calculators 88. The modules 84 and 86 are transparent to the calculator 88, i.e., the calculators 88 operate as if they were connected by a cable. Both the master module 84 and client module 86 have both send and receive capability. The client module 86 preferably has a programmable identification number (ID), for example, each client module could be identified by a number between 1 and 100. While the master module 84 and client module 86 have slightly different functions, the both sets of functions could be combined in a single module, so that a single design could be set to use either the master or client functions.

Figure 8:
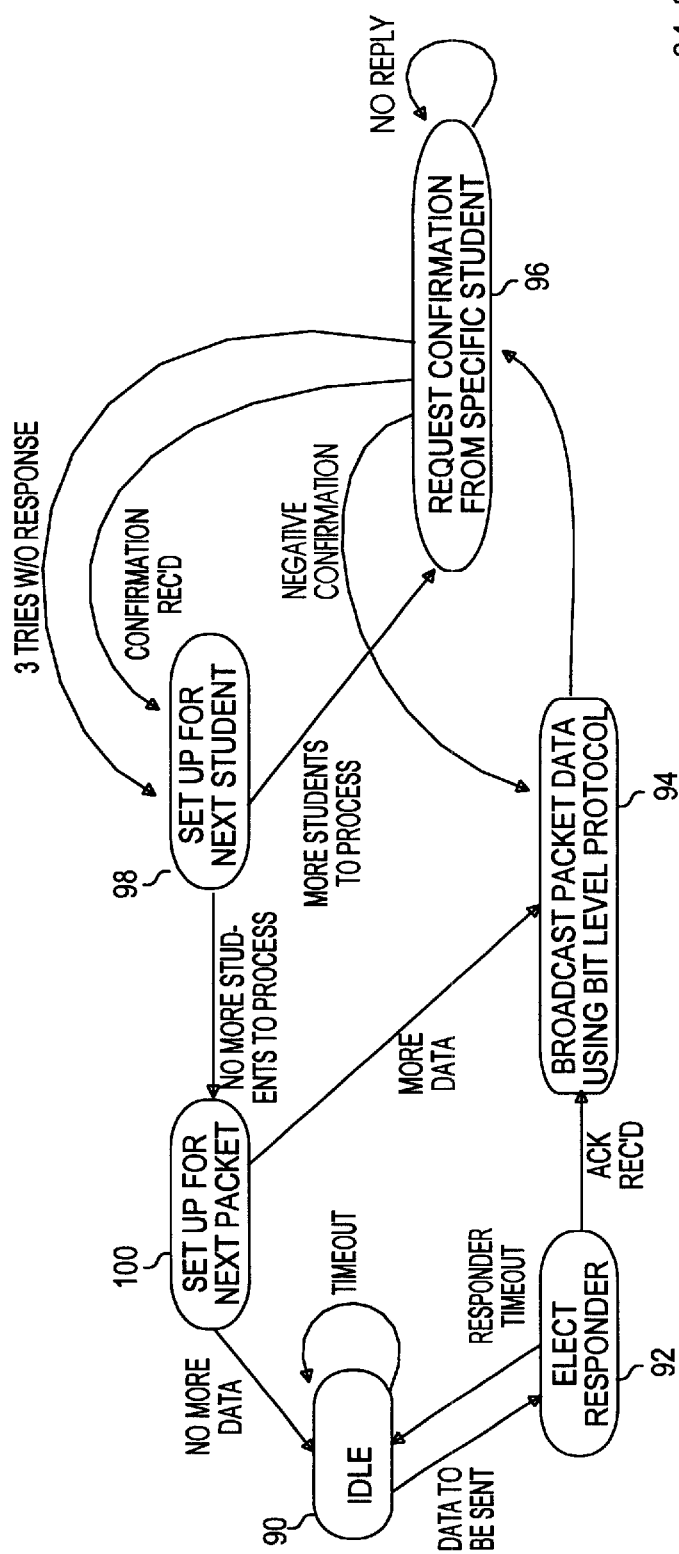

FIG. 8 illustrates a state diagram describing operation of the master module 84. In idle state 90, the master module 84 is waiting for data to send. When data is available for sending, the state changes to state 92. In this state, the master module selects a "responder", which is the client module which acts as the worst-case recipient of information from the master module. Normally, this responder will be the client module 86 which is furthest away from the master module 84. In state 92, the master module 84 broadcasts a request for a responder, identifying a particular client module 86. If there is no response within a predetermined timeout period, the state returns to the idle state 90. A failure to acknowledge a responder request could be due to a failure in the selected client module 86 (for example, the client module may be turned off) or the positioning of the selected client module 88 may be such that transmissions from the master module 86 are not reaching it, requiring the selected client module 86, and perhaps other client modules 86, to be repositioned.

Once the responder acknowledges the request in state 92, control of the master module 84 shifts to state 94 where a data packet (comprising a plurality of bits) is broadcast to all client modules 86. The packet of bits preferably includes error detection or error correction bits such that each client module 84 can determine whether a packet has been correctly received. If an error correction scheme is used, packets of data with one or more incorrect bits can be corrected without retransmission. The number of incorrect bits which can be corrected without retransmission depends on the scheme employed and the number of correction bits added to the data bits in the packet.

Figure 9A:
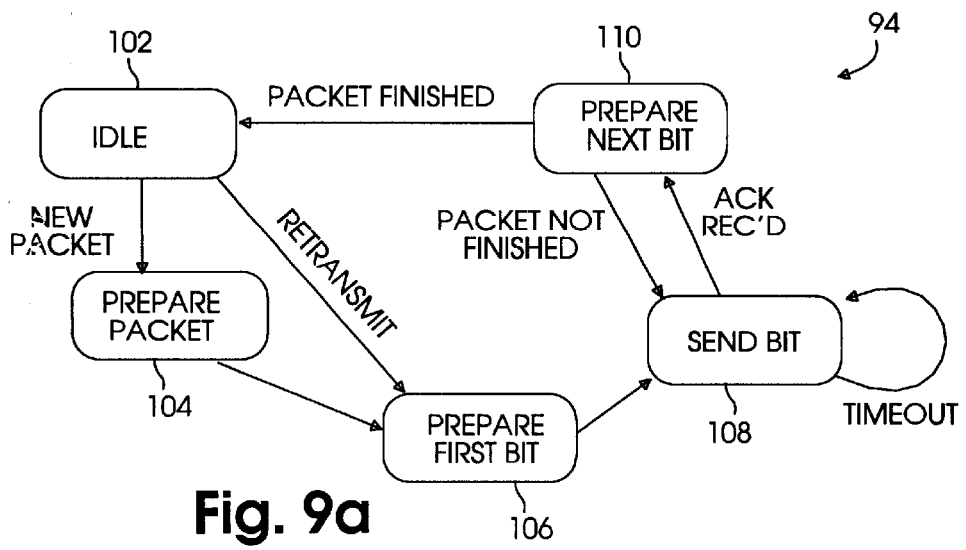
FIG. 9a illustrates a state diagram for data transfer using a bit level protocol.
Figure 9B:
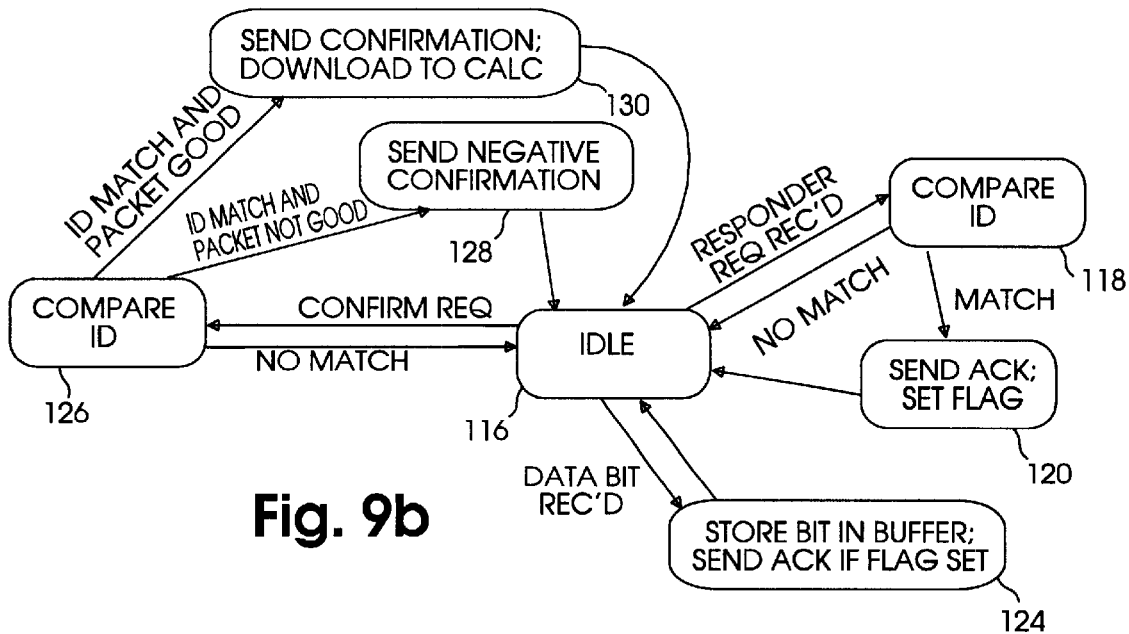
FIG. 9b illustrates a state diagram for the client module.

While the data packet is being broadcast to all client modules 86, only the responder verifies the receipt of each bit, using a method similar to the method shown in FIG. 4c. A more detailed state diagram for the bit level protocol is shown in FIGS. 9a–b. By acknowledging the receipt of each bit (or, alternatively, by acknowledging the receipt of groups of bits) at the responder, there can be a high degree of confidence that each bit is being received at all of the client modules 86.

In the preferred embodiment, each client module 86 has a memory buffer for storing the packet data. The packet data may be transferred from the client module to the attached calculator after the packet is verified as correct.

In states 96 and 98, the master module 84 polls each student module 86 to verify that the data has been correctly received prior to transmission of the next packet. In block 96, the master module 84 requests confirmation from a specific student that the data was correctly received, according the error detection/correction scheme employed in the module. If there is no response from the specific client module, the request will be repeated to a maximum number (for example, three attempts) at which time the master module 84 will continue to poll the remaining client modules in state 98. If a client module 86 returns a negative confirmation, i.e. if the error detection/correction routine determines that there is a non-correctable error in its received data packet, then the master module 84 re-broadcasts the data as described above in state 94. If a positive confirmation is received in state 96, the master module 84 sets up to confirm receipt from a next client module in block 98. The loop of states 94, 96 and 98 is continued until the master verifies that each client has received the data packet. At this point, when all students have made positive confirmations, the state changes to state 100, where the master sets up for the next packet. The state then changes to state 94, where the new packet is broadcast as described above. When there are no more packets to broadcast in state 100, the master module 84 returns to idle state 90.

FIG. 9a illustrates a more detailed state diagram corresponding to state 94, i.e., the routine for broadcasting packet data, from FIG. 8. State 102 (idle) is the entry point for the routine. When a new packet is available for broadcast, the packet is prepared in state 104. The actions involved in this state would include downloading data bits from the calculator 88 to the master module 84 and appending information identifying the packet. For example, each packet may be given an numeric identifier. After the packet is prepared in state 104, or if a packet is being retransmitted (see state 96 of FIG. 8), the bits are prepared for serial transmittal over the air in state 106. In state 108, the bit is broadcast to all client modules 86. To ensure proper communication, a verification of each bit is performed by the selected responder. If no acknowledgment of the bit is returned from the responder within a predetermined timeout period, the bit is rebroadcast. On the other hand, if the bit is properly acknowledged, the next bit is prepared in state 110. The loop of broadcasting and verifying each bit between states 108 and 110 continues until all bits in the packet are broadcast by the master module and acknowledged by the responder. Once all bits of the packet are broadcast and acknowledged, the master module continues to state 96 of FIG. 8, where the client modules are polled for confirmation of receipt of the packet.

FIG. 9b illustrates a state diagram describing operation of the client modules 86. When not receiving of sending data, the client module is in the idle state 116. If the master module sends a request for a responder (block 92 of FIG. 8), each client module compares the identification code (ID) of the client module selected by the master module 84 in state 118. If the identification code sent by the master module 84 does not match the identification code of the particular client module, that client module returns to the idle state. The client module corresponding to the requested identification code will match in state 118 and then sends an acknowledgment to the master module in state 120, signifying that it will bear responsibility for verifying each bit sent from the master module 84. The selected responder also sets an internal flag and returns to the idle state 116 where it waits for data transmissions.

When a data bit is received, each client module 86 stores the bit in an internal buffer in state 124. If the flag is set (i.e., if the client module is the designated responder), then that client module also sends an acknowledgment signal back to the master module 84 in state 124. The state then changes back to the idle state 116.

After all data bits for a packet are sent, the master module will poll the client modules to confirm that the data was properly received. When a confirmation request (which is directed to a particular client ID) is received in state 116, the state changes to state, 126, where each client module 86 compare the. ID from the master module 84 with its ID. For client modules where there is no match, the state returns to state 116. For the client module that matches the ID, either a confirmation is transmitted from the client module 86 to the master module 84 in state 130, if the packet was received, or a negative confirmation is transmitted from the client module 86 to the master module 84, if the packet was not properly received. The state then returns to the idle state 116.

Figure 10:
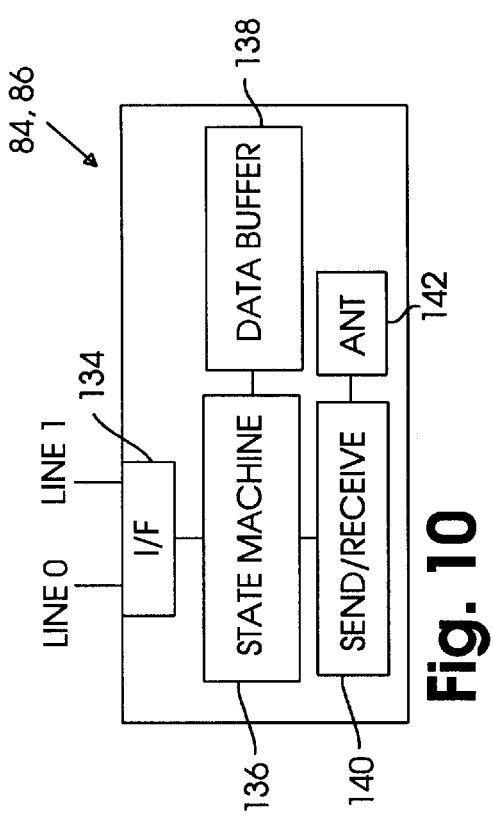
FIG. 10 illustrate a block diagram for a circuit implementing the master and client modules.

FIG. 10 illustrates a block diagram of a module which can be used as either the master module 84 or the client module 86. In FIG. 10, the module comprises interface circuitry 134 for coupling with the Line0 and Line1 input/outputs from the calculator.88. The interface circuitry 134. is coupled to a state machine 136. State machine 136 is coupled to a date buffer 138 and send/receive circuitry 140. Send/receive circuitry 140 is also coupled to antenna 142.

The state machine can be programmed to implement either the routines shown in FIGS. 8 and 9a, for the master module 84, or the routine shown in FIG. 9b, for the client module 86. The memory buffer allows the module to store a packet of data internally.

The embodiment described in connection with FIGS. 6–10 has significant advantages. First, as in the first embodiment, add-on modules can be used to update existing calculators, so that classrooms which have already purchased calculators do not lose their investment. Second, each calculator in the room is polled to confirm accurate transmittal of the data.

While the embodiments shown herein are directed to calculators in classroom settings, the wireless networks described herein could be used with any processing device, such as portable and desktop computers. In addition to classroom settings, the wireless network could be used in other settings, such as business conferences.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A wireless network comprising:
    a master processing device for generating information and broadcasting said information through wireless transmission of signals;
    a plurality of individually identifiable and addressable client processing devices having circuitry for receiving said information from said master processing device and transmitting other information to said master processing device, said master processing device broadcasting data to all of said client processing devices and selecting one and only one of said client processing devices to acknowledge receipt of each bit of data said master processing device broadcasts to all of said client processing devices.

2. The wireless network of claim 1 wherein said master processing device broadcasts said information as a series of packets, each packet containing a group of data bits.

3. The wireless network of claim 2 wherein said selected one of said client processing devices acknowledges the receipt of each bit broadcast by said master processing device.

4. The wireless network of claim 1 wherein said master processing device rebroadcasts packets which are not properly received by one or more of the client processing devices.

5. The wireless network of claim 2 wherein each packet contains one or more bits for detecting transmission errors.

6. The wireless network of claim 2 wherein each packet contains one or more bits for detecting and correcting transmission errors.

7. The wireless network of claim 1 wherein each packet contains one or more bits for detecting and correcting transmission errors.

8. A calculator network, comprising:
    a master calculator for generating information and broadcasting information through wireless transmission of signals;
    a plurality of client calculators each having circuitry for receiving said information from said master calculator, and transmitting other information to said master processing device, said master calculator broadcasting data to all of said client calculators and selecting one and only one of said client calculators to acknowledge receipt of each bit of data said master calculator broadcasts to all of said client calculators.

9. The calculator network of claim 8 wherein said master calculator broadcasts said information as a series of packets, each packet containing a group of data bits.

10. The calculator network of claim 9 wherein said selected one of said client calculators acknowledges the receipt of each bit broadcast by said master calculator.

11. The calculator network of claim 8 wherein said master calculator rebroadcasts packets which are not properly received by one or more of the client calculators.

12. The calculator network of claim 9 wherein each packet contains one or more bits for detecting transmission errors.

13. The calculator network of claim 9 wherein each packet contains one or more bits for detecting and correcting transmission errors.

14. A method of communicating between processing devices, comprising the steps of:
    generating information in a master processing device and broadcasting said information through wireless transmission of signals;
    receiving said information from said master processing device in a plurality of individually identifiable and addressable client processing devices and transmitting other information to said master processing device, said master processing device broadcasting data to all of said client processing devices and selecting one and only one of said client processing devices to acknowledge receipt of each bit of data said master processing device broadcasts to all of said client processing devices.

15. The method of claim 14 wherein said acknowledging step comprises the step of acknowledging the receipt of each bit at said one of said client processing devices.

16. The method of claim 15 wherein said polling step comprises the step of polling each client processing device after broadcasting each packet.

17. The method of claim 16 and further comprising the step of rebroadcasting any packet which is not properly received by one or more of said client calculators.

18. The method of claim 14 wherein each packet contains one or more bits for detecting transmission errors.

19. The method of claim 14 wherein each packet contains one or more bits for detecting and correcting transmission errors.

* * * * *